United States Patent
Liu et al.

(10) Patent No.: US 12,056,860 B2
(45) Date of Patent: Aug. 6, 2024

(54) IMAGE PROCESSING METHOD AND IMAGE PROCESSING DEVICE USING THE SAME

(71) Applicant: Cvitek Co. Ltd., Beijing (CN)

(72) Inventors: Bang-Sian Liu, Zhubei (TW); Ju-Yu Yu, Zhubei (TW); Jen-Shi Wu, Zhubei (TW); Bau-Cheng Shen, New Taipei (TW)

(73) Assignee: CVITEK CO. LTD., Beijing (CN)

( * ) Notice: Subject to any disclaimer, the term of this patent is extended or adjusted under 35 U.S.C. 154(b) by 394 days.

(21) Appl. No.: 17/563,962

(22) Filed: Dec. 28, 2021

(65) Prior Publication Data

US 2022/0207670 A1  Jun. 30, 2022

(30) Foreign Application Priority Data

Dec. 29, 2020  (CN) .......................... 202011591881.0

(51) Int. Cl.
*G06T 5/80* (2024.01)
*G06T 3/602* (2024.01)

(52) U.S. Cl.
CPC ............... *G06T 5/80* (2024.01); *G06T 3/602* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 2015/0256775 A1* | 9/2015 | Li | G06T 3/047 348/241 |
| 2015/0262344 A1* | 9/2015 | Stec | G06T 5/80 382/275 |
| 2016/0180507 A1* | 6/2016 | Paik | G06T 5/80 382/275 |
| 2016/0234438 A1* | 8/2016 | Satoh | H04N 23/667 |
| 2018/0144449 A1* | 5/2018 | Kim | G06T 5/80 |
| 2021/0374919 A1* | 12/2021 | Bindal | G06T 3/4007 |

FOREIGN PATENT DOCUMENTS

CN           107749050 A  *  3/2018  ............. G06T 5/006

* cited by examiner

*Primary Examiner* — Jiangeng Sun
(74) *Attorney, Agent, or Firm* — Innovation Counsel LLP

(57) ABSTRACT

The present invention discloses an image processing method. The image processing method includes the following steps: (a), a to-be-processed image is corrected as a first correction image according to a first mapping relationship along a correction direction; (b) the first correction image by an angle is rotated; and (c) the rotated first correction image is corrected as a second correction image according to a second mapping relationship along the same correction direction. In embodiment, given that the to-be-processed image is deformed along two different directions, the to-be-processed image is corrected along the same correction direction, such that correction complexity could be reduced.

12 Claims, 14 Drawing Sheets

IMAGE PROCESSING METHOD AND IMAGE PROCESSING DEVICE USING THE SAME

This application claims the benefit of People's Republic of China application Serial No. 202011591881.0, filed on Dec. 29, 2020, the subject matter of which is incorporated herein by reference.

BACKGROUND OF THE INVENTION

Field of the Invention

The invention relates in general to a processing method and a processing device using the same, and more particularly to an image processing method and an image processing device using the same.

Description of the Related Art

Due to some factors, the images captured by a conventional camera may be deformed. Therefore, it has become a prominent task for the industries of the technology field to develop a new image processing method and an image processing device using the same to resolve the problems of image deformation encounter in the prior art.

SUMMARY OF THE INVENTION

The invention is directed to an image processing method and an image processing device using the same capable of resolving the problems disclosed above.

According to one embodiment of the present invention, an image processing method is provided. The image processing method includes the following steps: (a), a to-be-processed image is corrected as a first correction image according to a first mapping relationship along a correction direction; (b) the first correction image by an angle is rotated; and (c) the rotated first correction image is corrected as a second correction image according to a second mapping relationship along the same correction direction. In embodiment, given that the to-be-processed image is deformed along two different directions, the to-be-processed image is corrected along the same correction direction, such that correction complexity could be reduced.

According to another embodiment of the present invention, an image processing device is provided. The image processing device includes a first correction unit and a second correction unit. The first correction unit is configured to: correct a to-be-processed image as a first correction image according to a first mapping relationship along a correction direction and rotate the first correction image by an angle. The second correction unit configured to: correct the rotated first correction image as a second correction image according to a second mapping relationship along the same correction direction.

The above and other aspects of the invention will become better understood with regard to the following detailed description of the preferred but non ting embodiment(s). The following description is made with reference to the accompanying drawings.

DETAILED DESCRIPTION OF THE INVENTION

Detailed descriptions of the invention are disclosed below with embodiments accompanying drawings. However, the descriptions are for exemplary purpose only, not for limiting the scope of protection of the present invention.

Figure 1:
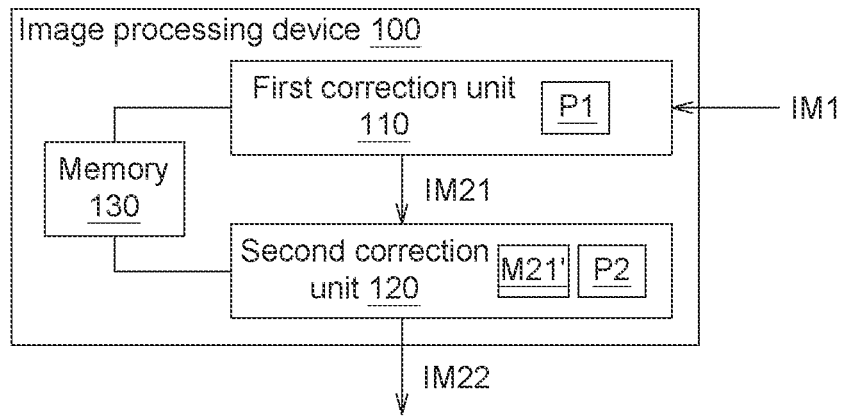
FIG. 1 is a functional block diagram of an image processing device according to an embodiment of the present invention.
Figure 2A:
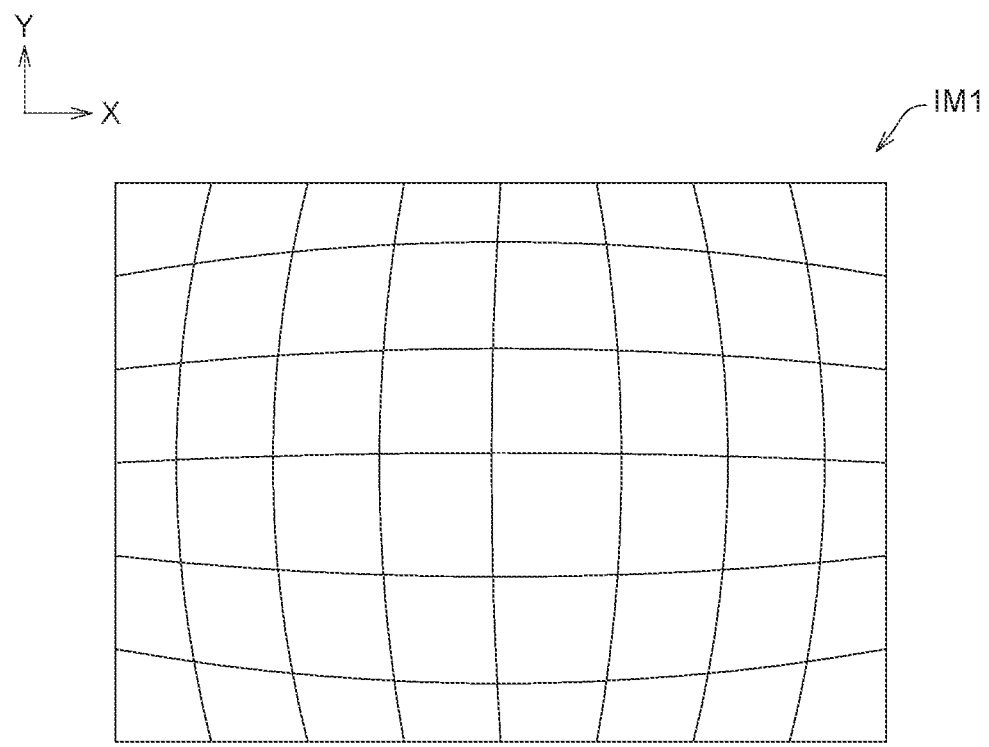
FIGS. 2A to 2E are correction processes of correcting a to-be-processed image by the image processing device of FIG. 1.
Figure 2B:
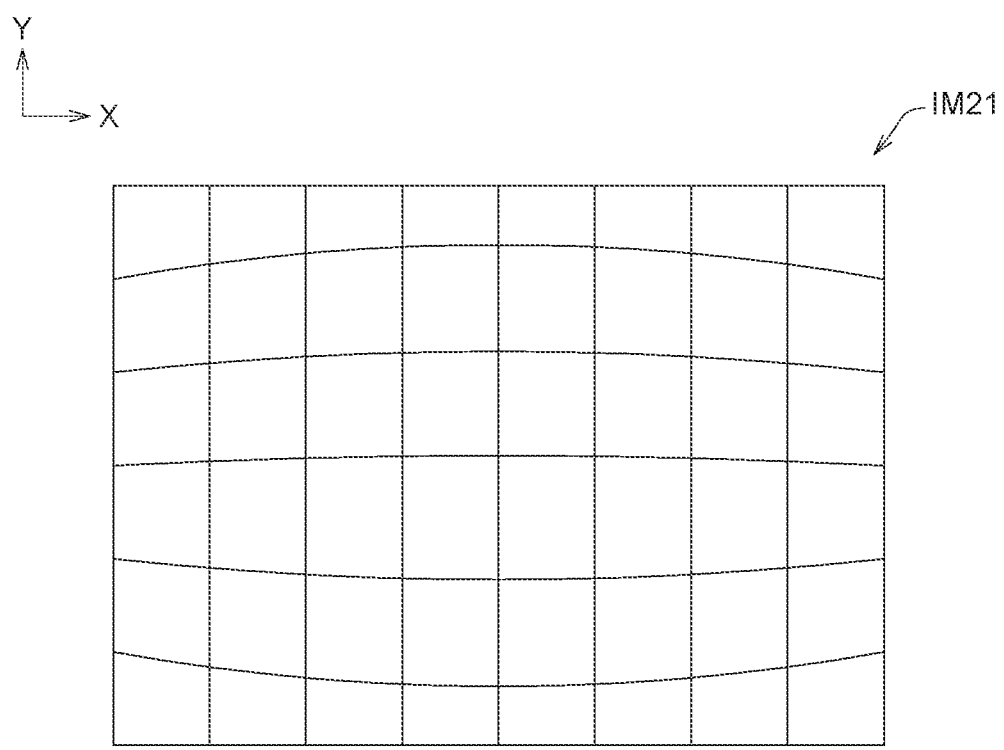
Figure 2C:
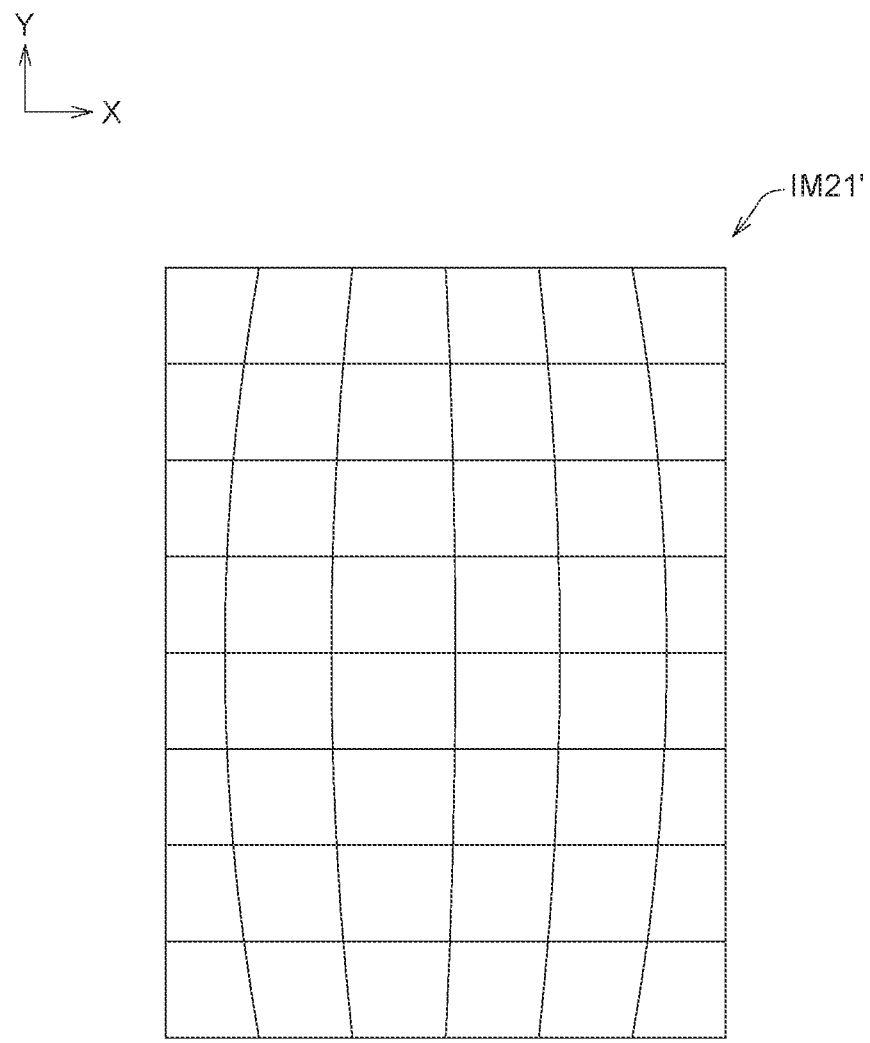
Figure 2D:
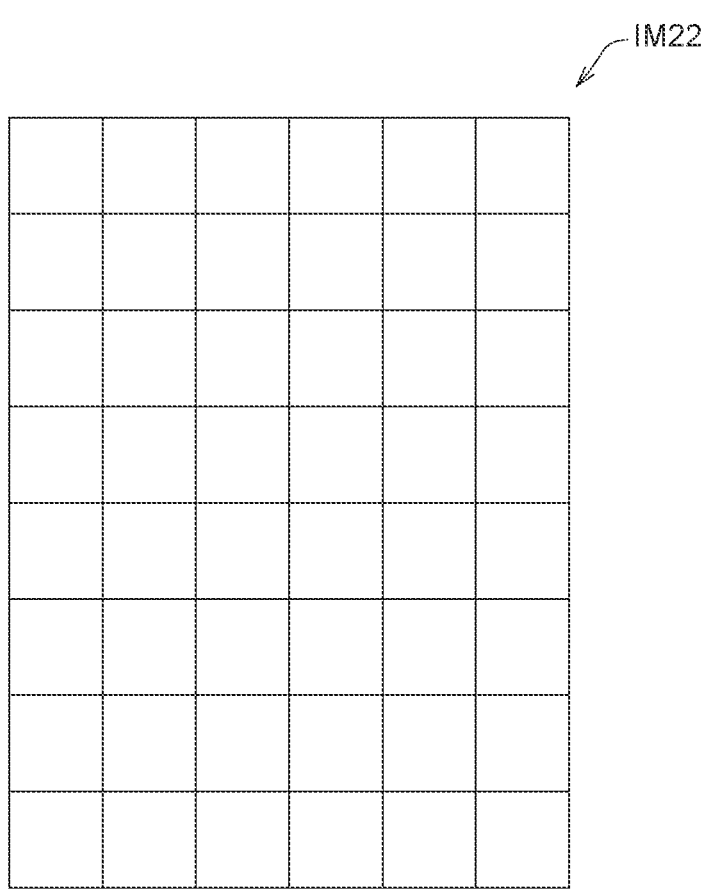
Figure 2E:
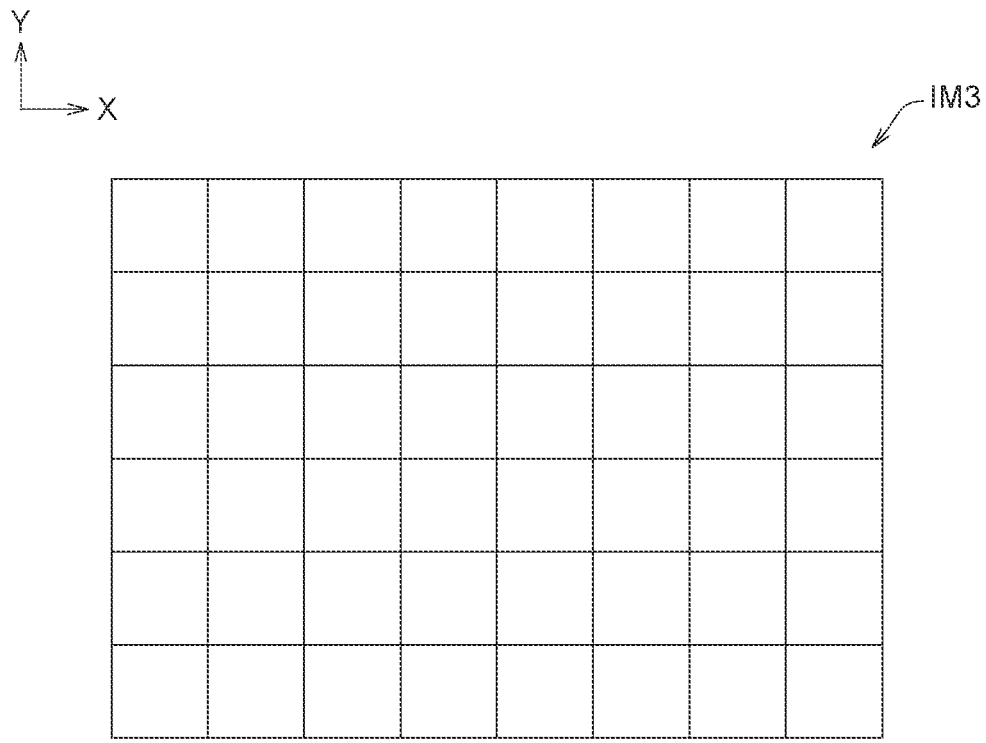
Figure 3:
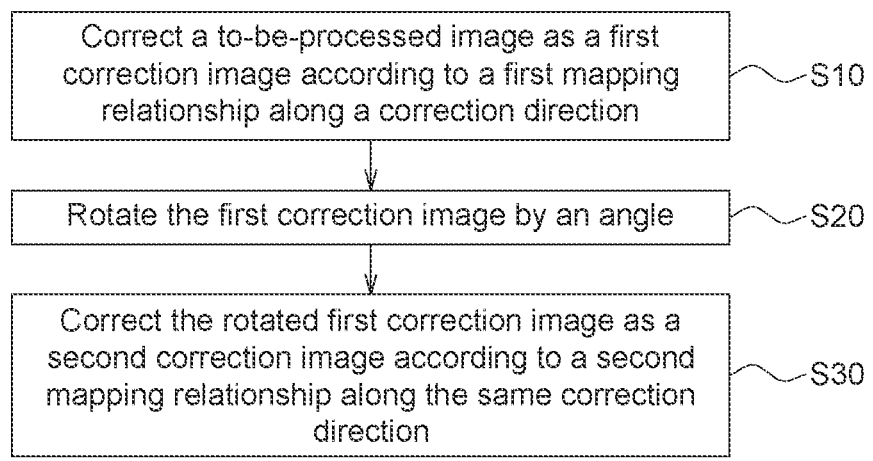
FIG. 3 is a flowchart of an image processing method of the image processing device of FIG. 1.

Refer to FIGS. 1, 2A to 2E and 3. FIG. 1 is a functional block diagram of an image processing device 100 according to an embodiment of the present invention. FIGS. 2A to 2E are correction processes of correcting a to-be-processed image by the image processing device 100 of FIG. 1. FIG. 3 is a flowchart of an image processing method of the image processing device 100 of FIG. 1.

The image processing device 100 includes a first correction unit 110, a second correction unit 120 and a memory 130. The first correction unit 110 is configured to: correct the to-be-processed image IM1 (illustrated in FIG. 2A) as a first correction image IM21 (illustrated in FIG. 2B) and rotate the first correction image IM21 by an angle according to the first mapping relationship P1 along a correction direction. The second correction unit 120 is configured to correct the rotated first correction image IM21' (illustrated in FIG. 2C) as a second correction image IM22 (illustrated in FIG. 2D) according to a second mapping relationship P2 along the same correction direction. In the present embodiment, the image processing device 100 corrects the to-be-processed image IM1 twice along the same correction direction. The term "same correction direction" refers to the correction order and/or correction path of several blocks and/or several grids being the same.

In another embodiment, the second correction unit 120 could correct the second correction image IM22 as a third correction image IM3, wherein the direction of the third correction image IM3 with respect to the to-be-processed image IM1 remains the same, that is, the third correction image IM3 is not rotated with respect to the to-be-processed image IM1.

The image processing device 100 could be realized by a camera. The first correction unit 110 and the second correction unit 120 could be realized physical circuits, such as semiconductor chips or semiconductor packages, formed using semiconductor process. Besides, the first correction unit 110 and the second correction unit 120 could be integrated as one element; or the first correction unit 110 and/or the second correction unit 120 could be integrated to a processor or a controller.

As indicated in FIG. 2A, the to-be-processed image IM1 is a distorted image, wherein the image content of the to-be-processed image IM1 is deformed (such as distorted) along the X-axis and/or the Y-axis. As indicated in FIG. 2B, the first correction unit 110 corrects the to-be-processed image IM1 as a first correction image IM21 according to a first mapping relationship P1, and the deformation (such as distortion) of the first correction image IM21 with respect to the to-be-processed image IM1 has been corrected along the Y-axis direction. As indicated in FIG. 2C, the first correction unit 110 rotates the first correction image IM21 as a rotated first correction image IM21' by an angle, such as +/−90°. As indicated in FIG. 2D, the second correction unit 120 corrects the rotated first correction image IM21' as a second correction image IM22 according to the second mapping relationship P2. The deformation (such as distortion) of the second correction age IM22 with respect to the rotated first correction image IM21' has been corrected along the X-axis direction.

The first mapping relationship P1 and/or the second mapping relationship P2 could be offline or established beforehand. The first mapping relationship P1 and/or the second mapping relationship P2 record the mapping relationships between a deformed image and an aligned image. The first correction unit 110 and the second correction unit 120 could resolve or correct the deformation of the to-be-processed image IM1 according to the first mapping relationship P1 and the second mapping relationship P2. The embodiments of the present invention do not specify the first mapping relationship P1 and/or the second mapping relationship P2 and any mapping relationship capable of correcting the deformation of the to-be-processed image IM1 would do. Moreover, the first mapping relationship P1 contains several mesh tables, which provide the correction/mapping relationship between the to-be-processed block and the first correction block. Similarly, the second mapping relationship P2 contains several mesh tables, which provide the correction/mapping relationship between the first correction block and the second correction block.

As indicated in FIG. 3, the image processing method of the image processing device 100 includes steps S10 to S30. In step S10, a to-be-processed image IM1 (illustrated in FIG. 2A) is corrected as a first correction image IM21 (illustrated in FIG. 2B) by the first correction unit 110 according to a first mapping relationship P1 along a correction direction. In step S20, the first correction image IM21 is rotated by an angle by the first correction unit 110. In step S30, the rotated first correction image IM21' (illustrated in FIG. 2C) is corrected as a second correction image IM22 (illustrated in FIG. 2D) by the second correction unit 120 according to the second mapping relationship P2 along the same correction direction.

A number of embodiments of the image processing method are exemplified below.

First Embodiment

Figure 4A:
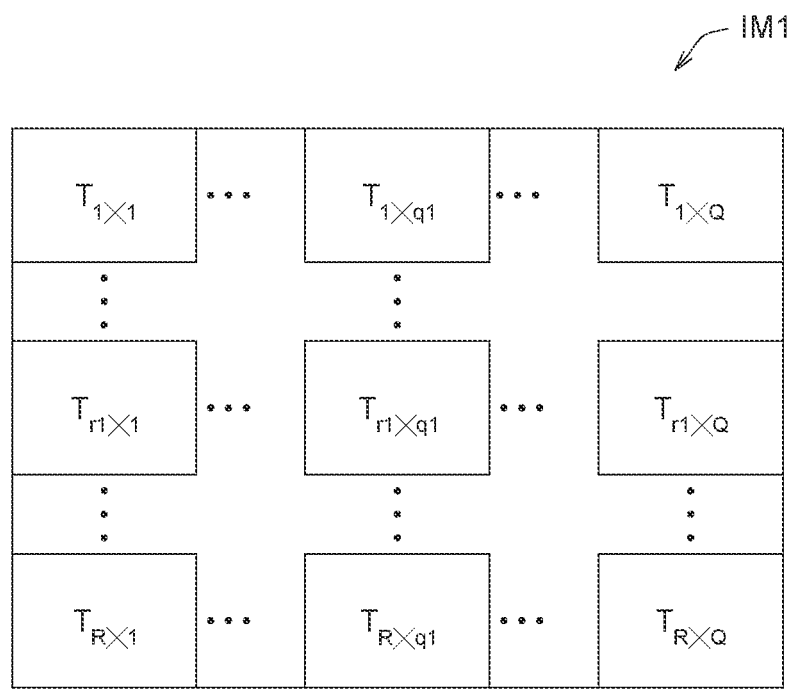
FIG. 4A is a position diagram of $r1 \times q1$ to-be-processed blocks $T_{r1 \times q1}$ of the to-be-processed image according to an embodiment of the present invention.
Figure 4B:
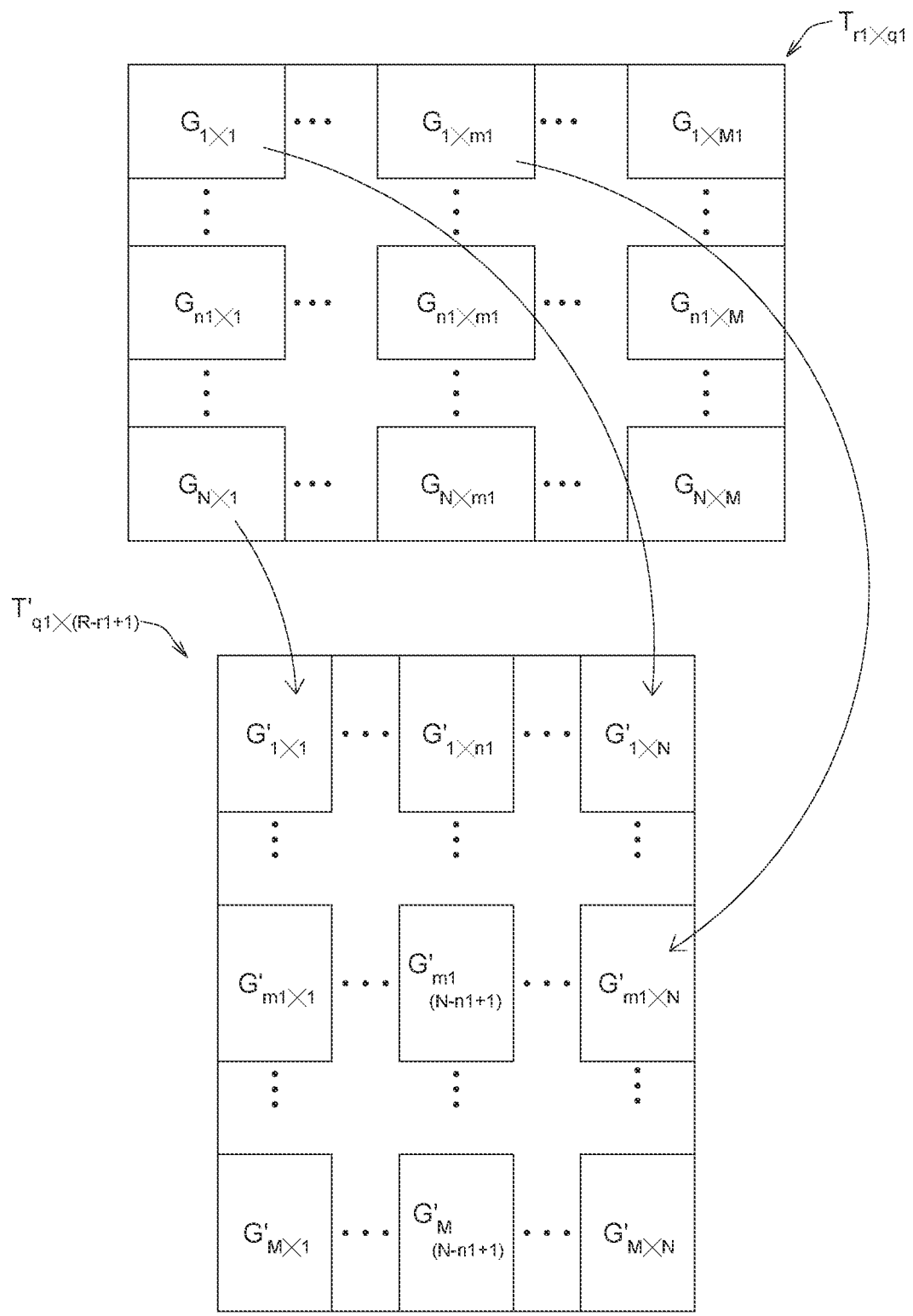
FIG. 4B is a diagram of the to-be-processed grid $G_{n1 \times m1}$ of the to-be-processed block $T_{r1 \times q1}$ of FIG. 4A corrected as the first correction grid $G_{m1 \times (N-n1+1)}'$.
Figure 4C:
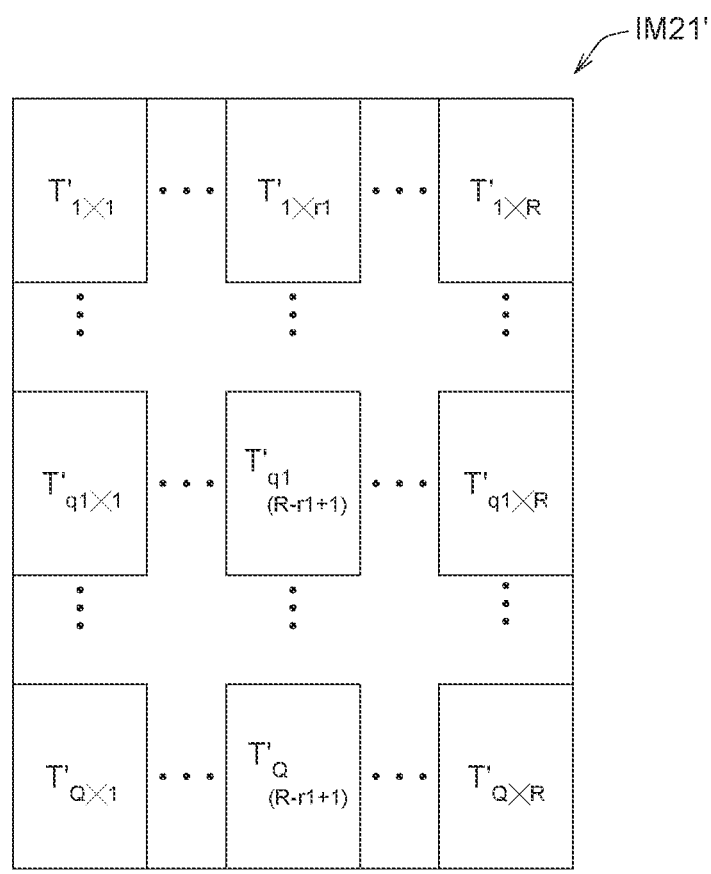
FIG. 4C is a diagram of several first correction blocks $T_{q1 \times (R-r1+1)'}$ contained in the corrected and rotated first correction image of FIG. 2C.
Figure 4D:
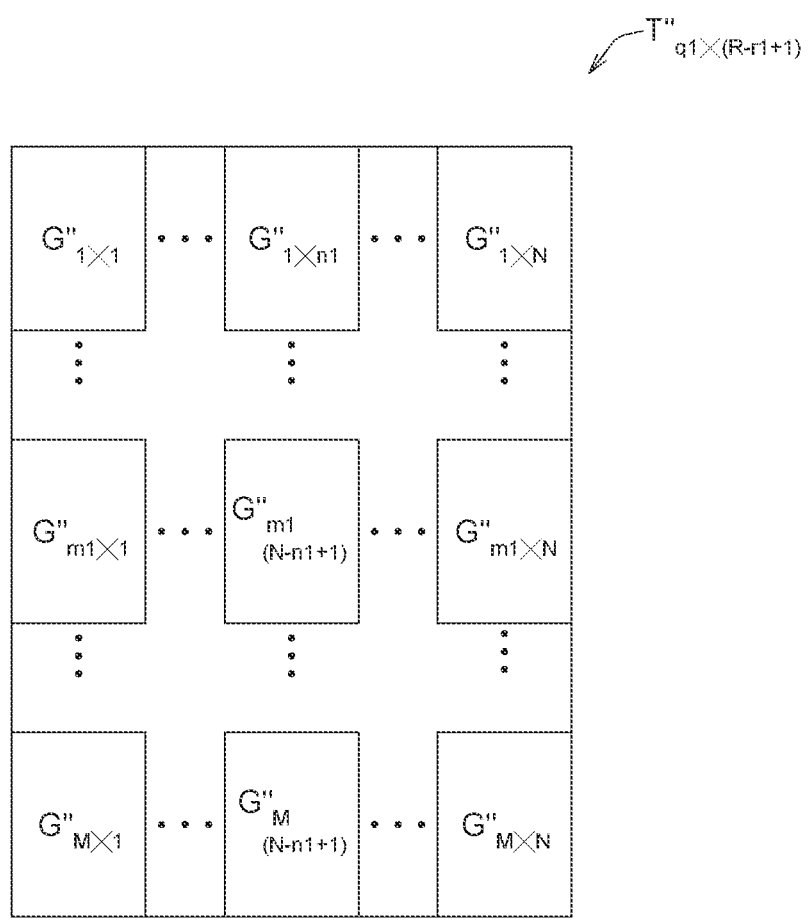
FIG. 4D is a position diagram of the first correction grid $G_{m1 \times (N-n1+1)}'$ of FIG. 4B corrected as the second correction grid $G_{m1 \times (N-n1+1)}''$.
Figure 5A:
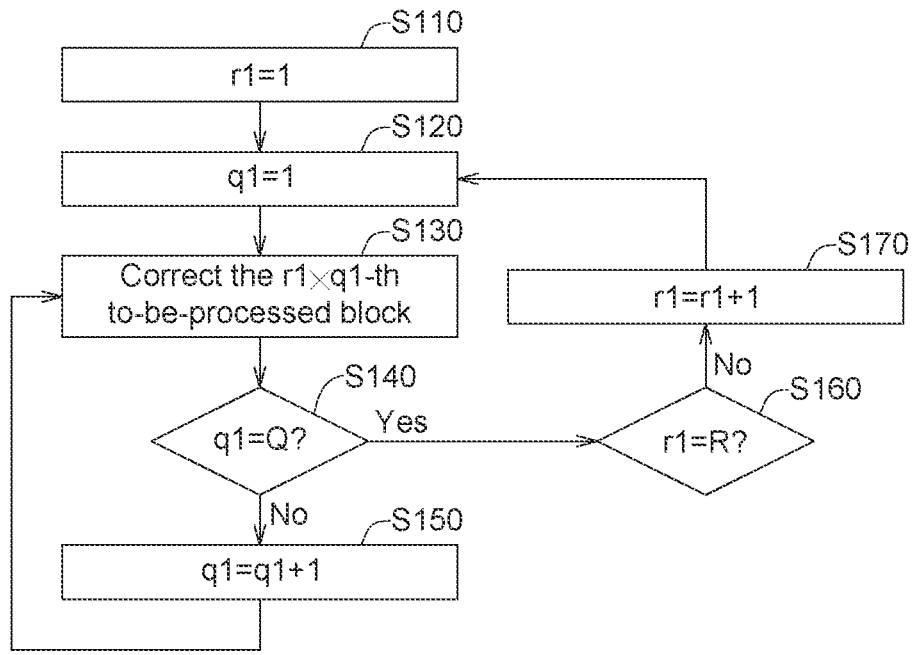
FIGS. 5A to 5B are flowcharts of an image processing method of the image processing device of FIG. 1.
Figure 5B:
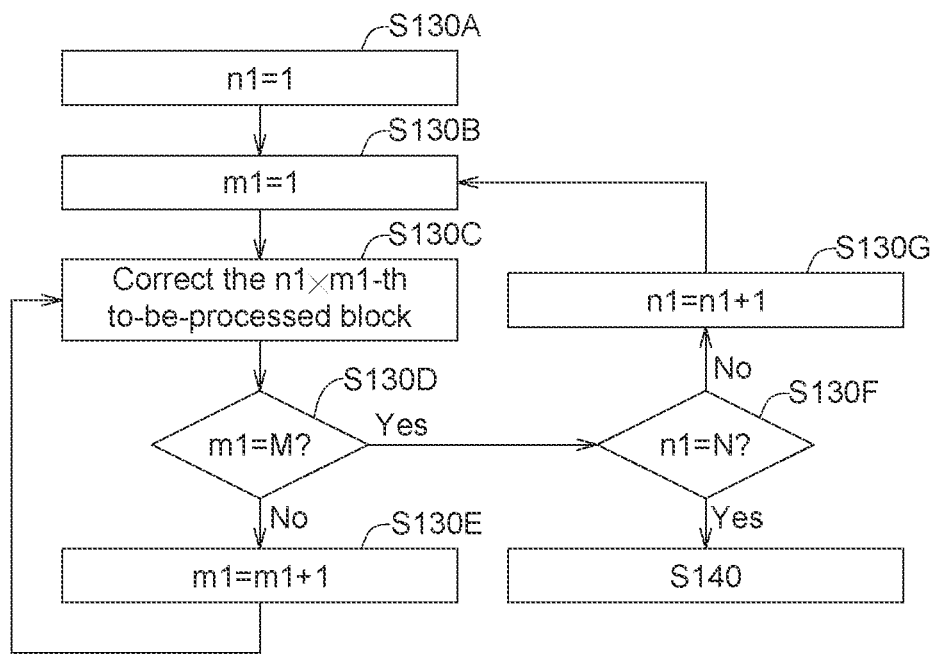

Refer to FIGS. 4A to 4D and 5A to 5B. FIG. 4A is a position diagram of r1×q1 to-be-processed blocks $T_{r1 \times q1}$ of the to-be-processed image according to an embodiment of the present invention. FIG. 4B is a diagram of the to-be-processed grid $G_{n1 \times m1}$ of the to-be-processed block $T_{r1 \times q1}$ of FIG. 4A corrected as the first correction grid $G_{m1 \times (N-n1+1)}'$. FIG. 4C is a diagram of several first correction blocks $T_{q1 \times (R-r1+1)}'$ contained in the corrected and rotated first correction image of FIG. 2C. FIG. 4D is a position diagram of the first correction grid $G_{m1 \times (N-n1+1)}'$ of FIG. 4B corrected as the second correction grid $G_{m1 \times (N-n1+1)}''$. FIGS. 5A to 5B are flowcharts of an image processing method of the image processing device 100 of FIG. 1.

In step S10, the (n1×m1)-th to-be-processed grid $G_{n1 \times m1}$ of the (r1×q1)-th to-be-processed block $T_{r1 \times q1}$ is corrected by the first correction unit 110 according to the first mapping relationship P1.

Before correcting the to-be-processed block $T_{r1 \times q1}$, as indicated in FIG. 4A, the first correction unit 110 could divide the to-be-processed image IM1 into r1×q1 to-be-processed blocks $T_{r1 \times q1}$ according to the (r1×q1)-th mesh table $PT1_{r1 \times q1}$ of the first mapping relationship P1, wherein r1 is a positive integer in the range of 1 to R, q1 is a positive integer in the range of 1 to Q, R is a maximum of parameter r1, and Q is a maximum of parameter q1. In an embodiment, R and Q could be 8 or any other positive integer. As indicated in FIG. 4B, the first correction unit 110 could divide the (r1×q1)-th to-be-processed block $T_{r1 \times q1}$ into n1×m1 to-be-processed grids $G_{n1 \times m1}$ according to the (r1×q1)-th mesh table $PT1_{r1 \times q1}$ of the first mapping relationship P1, wherein n1 is a positive integer in the range of 1 to N, m1 is a positive integer in the range of 1 to M, N is a maximum of parameter n1, and M is a maximum of parameter m1. In an embodiment, N and M could be 8 or any other positive integer.

Furthermore, before correcting the to-be-processed block $T_{r1 \times q1}$, the first correction unit 110 could sequentially write r1×q1 to-be-processed blocks $T_{r1 \times q1}$ to the memory 130. For example, the first correction unit 110 could sequentially write the (r1×q1)-th to-be-processed block $T_{r1 \times q1}$ to the memory 130 according to parameter r1 in an ascending order and parameter q1 in an ascending order. For example, the first correction unit 110 could sequentially write several to-be-processed blocks $T_{1 \times 1}$, $T_{1 \times 2}$, ..., $T_{1 \times Q}$ of the to-be-processed blocks $T_{1 \times q1}$ in the $1^{st}$ row (r1=1) (according to a parameter q1 in an ascending order) to the memory 130, then write sequentially several to-be-processed blocks $T_{2 \times 1}$, $T_{2 \times 2}$, ..., $T_{2 \times Q}$ of the to-be-processed blocks $T_{2 \times q1}$ in the $2^{nd}$ row (r1=2) (according to a parameter q1 in an ascending order) to the memory 130. The rest could be obtained by the same analogy until several to-be-processed blocks $T_{R \times 1}$, $T_{R \times 2}$, ..., $T_{R \times Q}$ in the R-th row (r1=R) are sequentially (according to a parameter q1 in an ascending order) written to the memory 130. In the subsequent process of correcting the to-be-processed block $T_{r1 \times q1}$, the first correction unit 110 could sequentially read the to-be-processed block $T_{r1 \times q1}$ from the memory 130.

In step S20, the first correction image IM21 is rotated by an angle by the first correction unit 110.

Steps S10 and S20 could be performed concurrently, that is, after each to-be-processed block $T_{r1 \times q1}$ is corrected, the corrected image is written to the memory in the form of a rotated image to obtain a rotated first correction image IM21'.

The method is exemplified below with FIGS. 5A and 5B.

The first correction unit 110 sequentially corrects the to-be-processed block $T_{r1 \times q1}$. As indicated in FIG. 5A, the (r1×q1)-th to-be-processed block $T_{r1 \times q1}$ is sequentially corrected by the first correction unit 110 according to a parameter r1 in an ascending order and a parameter q1 in an ascending order. The correction order is referred as "correction direction" in the present disclosure.

In step S110, the initial value of the parameter r1 is set to 1 by the first correction unit 110.

In step S120, the initial value of the parameter q1 is set to 1 by the first correction unit 110.

In step S130, the data of the to-be-processed block $T_{r1 \times q1}$ is read from the memory 130 and is corrected by the first correction unit 110. After the correction of the to-be-processed block $T_{r1 \times q1}$ is completed, the method proceeds to step S140.

In step S140, whether q1=Q is determined by the first correction unit 110: if the determination result is positive, this indicates that the correction of all to-be-processed blocks $T_{r1 \times q1}$ in the r1-th row is already completed, then the method proceeds to step S160; if the determination result is negative, this indicates that the correction of all to-be-processed blocks $T_{r1 \times q1}$ in the r1-th row is not yet completed, then the method proceeds to step S150.

In step S150, q1=q1+1 is set by the first correction unit 110, then the process returns to step S130, the next to-be-processed block $T_{r1 \times q1}$ in the r1-th row is processed.

In step S160, after the correction of all to-be-processed blocks $T_{r1 \times q1}$ in the R-th row is completed, whether r1=R is determined by the first correction unit 110: if the determination result is positive, this indicates that the correction of the to-be-processed block $T_{R \times q1}$ in the last row (the R-th row) is already completed and the correction of the first correction image IM21 is completed, then the method terminates; if the determination result is negative, this indicates that the correction of the to-be-processed block $T_{R \times q1}$ in the last row (the R-th row) is not yet completed, then the method proceeds to step S170.

In step S170, r1=r1+1 is set by the first correction unit 110, and the method returns to step S120, the to-be-processed block $T_{r1 \times q1}$ in the next row (the r1-th row) is corrected.

Details of the correction process of all to-be-processed grids $G_{n1 \times m1}$ of the (r1×q1)-th to-be-processed block $T_{R \times q1}$ by the first correction unit 110 and the second correction unit 120 are disclosed below with FIG. 5B. The first correction unit 110 sequentially corrects the to-be-processed grids $G_{n1 \times m1}$. For example, the (n1×m1)-th to-be-processed grid $G_{n1 \times m1}$ is sequentially corrected according to a parameter n1 in an ascending order and a parameter m1 in an ascending order. The correction order is referred as "correction direction" in the present disclosure.

In step S130A the initial value of the parameter n1 is set to 1 by the first correction unit 110.

In step S130B, the initial value of the parameter m1 is set to 1 by the first correction unit 110.

In step S130C, the (n1×m1)-th to-be-processed grid $G_{n1 \times m1}$ of the (r1×q1)-th to-be-processed block $T_{R \times q1}$ is corrected by the first correction unit 110. The to-be-processed grid $G_{n1 \times m1}$ contains several pixels. The first correction unit 110 corrects the pixels of the to-be-processed grid $G_{n1 \times m1}$ according to the (r1×q1)-th mesh table $PT1_{r1 \times q1}$ of the first mapping relationship P1.

As indicated in FIG. 4B, the first correction unit 110 corrects the (n1×m1)-th to-be-processed grid $G_{n1 \times m1}$ as the (m1×(N−n1+1))-th first correction grid $G_{m1 \times (N-n1+1)}'$ of the first correction image IM21 according to the (r1×q1)-th mesh table $PT1_{r1 \times q1}$ of the first mapping relationship P1. In the example of the to-be-processed grid $G_{1 \times 1}$ (n1=1, m1=1). The corrected to-be-processed grid $G_{1 \times 1}$ is written to the first correction grid $G_{1 \times N}'$ of the first correction image IM21 of FIG. 4B (m1=1, (N−n1+1)=N). In the example of the to-be-processed grid $G_{1 \times m1}$ (n1=1), the corrected to-be-processed grid $G_{1 \times m1}$ is written to the first correction grid $G_{m1 \times N}'$ of the first correction image IM21 of FIG. 4B (N−n1+1)=N). The rest could be obtained by the same analogy until all to-be-processed grids $G_{n1 \times m1}$ are corrected and rotated. With respect to the to-be-processed image IM1, the rotated first correction image IM21' is rotated 90° clockwise (the first rotation direction).

In step S130D, whether m1=M is determined by the first correction unit 110: if the determination result is positive, this indicates that the correction of all to-be-processed grids $G_{n1 \times m1}$ in the n1-th row is already completed, then the method proceeds to step S130F; if the determination result is negative, this indicates that the correction of all to-be-processed grids $G_{n1 \times m1}$ in the n1-th row is not yet completed, then the method proceeds to step S130E.

In step S130E, m1=m1+1 is set by the first correction unit 110, and the method returns to step S130C, the next to-be-processed grid $G_{n1 \times m1}$ in the n1-th row is corrected.

In step S130F, after the correction of all to-be-processed grids $G_{n1 \times m1}$ in the n1-th row is completed, whether n1=N is determined by the first correction unit 110: if the determination result is positive, this indicates that the correction of the to-be-processed grid $G_{N \times m1}$ in the last row (the N-th row) is already completed, then the method proceeds to step S140 of FIG. 5A, the next to-be-processed block $T_{R \times q}$ is corrected by the first correction unit 110; if the determination result is negative, this indicates that the correction of the to-be-processed grid $G_{n1 \times m1}$ in the last row (the N-th row) is not yet completed, then the method proceeds to step S130G.

In step S130G, n1=n1+1 is set by the first correction unit 110, then the method returns to step S130B, the to-be-processed grid $G_{n1 \times m1}$ in the next row (the n1-th row) is corrected.

The first correction unit 110 sequentially corrects all to-be-processed grids $G_{n1 \times m1}$ of all to-be-processed blocks $T_{r1 \times q1}$ according to the processes illustrated in FIGS. 5A and 5B. After all to-be-processed grids $G_{N \times m1}$ of all to-be-processed blocks $T_{r1 \times q1}$ are completed, a rotated first correction image IM21' as indicated in FIG. 4C is obtained. The rotated first correction image IM21' contains Q×R first correction blocks $T_{q1 \times (R-r1+1)}'$. The relationship of relative positions between the first correction blocks $T_{q1 \times (R-r1+1)}'$ and the to-be-processed block $T_{r1 \times q1}$ is identical to that between the first correction grids $G_{m1 \times (N-n1+1)}'$ and the to-be-processed grid $G_{N \times m1}$. The relationship indicates a clockwise rotation of 90° (the first rotation direction).

In step S30, the rotated first correction image IM21' is corrected as a second correction image IM22 by the second correction unit 120 according to the (r1×q1)-th mesh table $PT2_{r1 \times q1}$ of the second mapping relationship P2 along the same correction direction. For example, the second correction unit 120 sequentially corrects the first correction block $T_{q1 \times (R-r1+1)}'$ of FIG. 4C as the second correction block $T_{q1 \times (R-r1+1)}''$ according to a parameter q1 in an ascending order and a parameter (R−q1+1) in ascending order. Similarly, as indicated in FIG. 4D, when correcting the (q1×(R−r1+1))-th first correction block $T_{q1 \times (R-r1+1)}'$, the second correction unit 120 sequentially corrects the first correction grid $G_{m1 \times (N-n1+1)}$ according to a parameter m1 in an ascending order and a parameter (N−n1+1) in an ascending order.

In the example of correcting the (q1×(R−r1+1))-th first correction block $T_{q1 \times (R-r1+1)}$, as indicated in FIG. 4D, the second correction unit 120 corrects the (m1×(N−n1+1))-th first correction grid $G_{m1 \times (N-n1+1)}'$, and writes the corrected (m1×(N−n1+1))-th first correction grid $G_{m1 \times (N-n1+1)}'$ to the (m1×(N−n1+1))-th second correction grid $G_{m1 \times (N-n1+1)}''$ of the second correction image IM22. In the example of the first correction grid $G_{1 \times 1}'$, the second correction unit 120 writes the corrected first correction grid $G_{1 \times 1}'$ to the second correction grid $G_{1 \times 1}''$ of the second correction image IM22. The correspondence relationship in the two examples is the same. By the same analogy, all first correction grids $G_{m1 \times (N-n1+1)}'$ could be corrected. Thus, with respect to the rotated first correction image IM21', the direction of the second correction image IM22 remains the same, that is, the second correction image IM22 is not rotated.

Besides, the image processing device 100 could output the second correction image IM22 to display the second correction image IM22.

Second Embodiment

In the present embodiment the rotated first correction image IM21' is 90° anti-clockwise (the first rotation direction) with respect to the to-be-processed image IM1. Detailed descriptions are disclosed below.

Figure 6A:
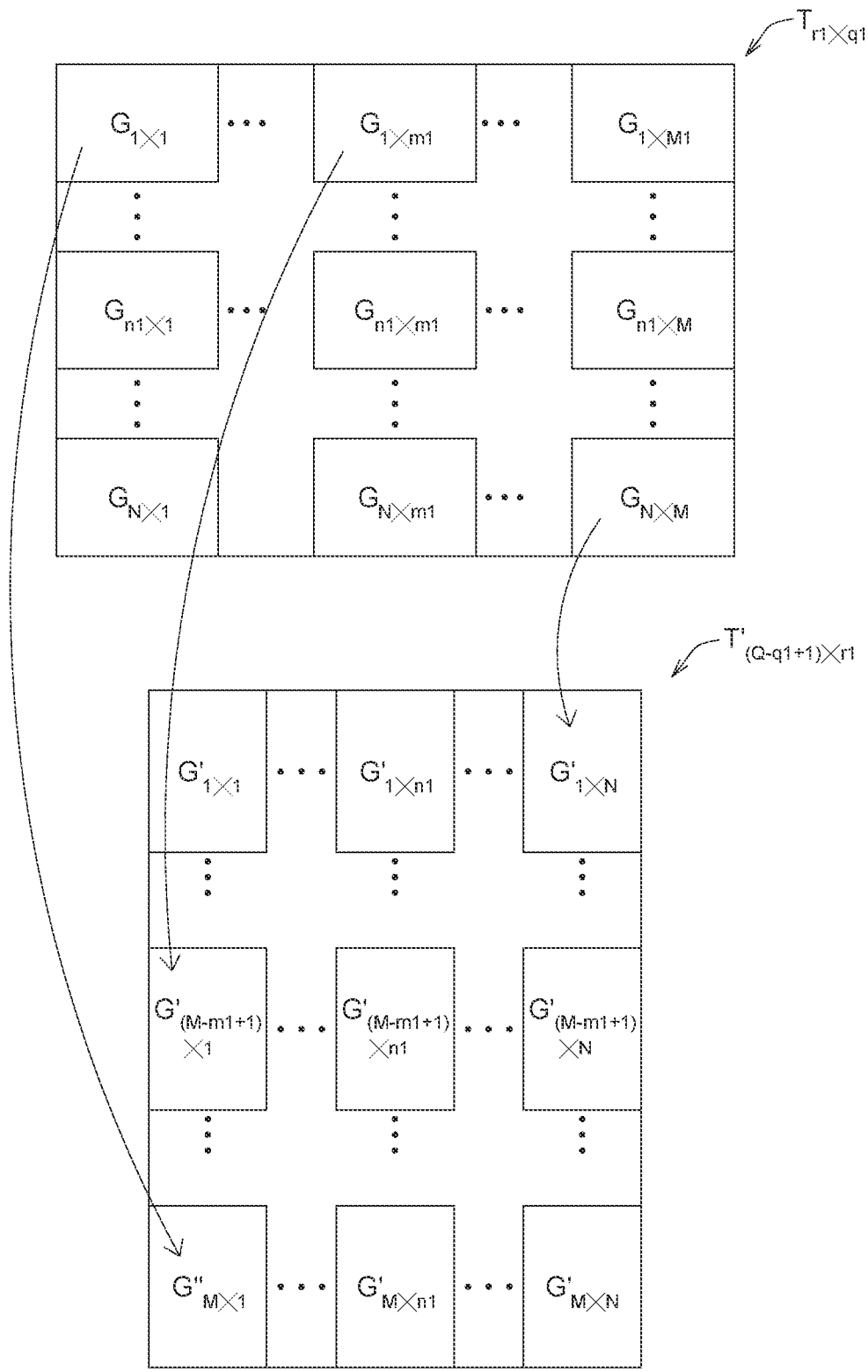
FIG. 6A is a position diagram of the to-be-processed grid $G_{n1 \times m1}$ of FIG. 4B corrected as the first correction grid $G_{(M-m1+1) \times n1}'$.
Figure 6B:
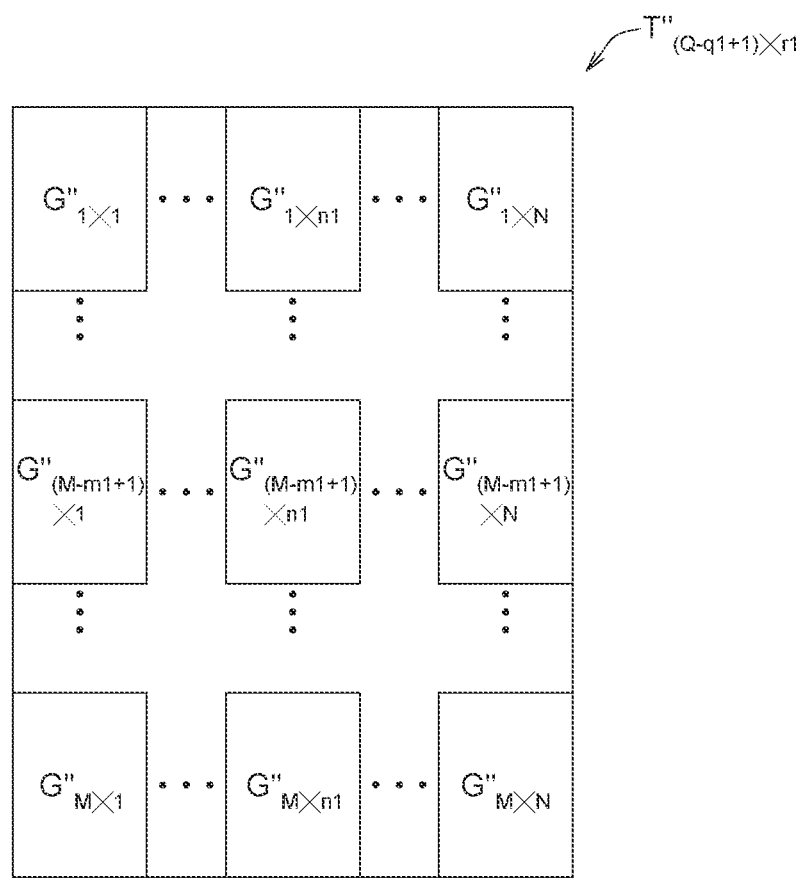
FIG. 6B is a position diagram of the first correction grid $G_{(M-m1+1) \times n1}'$ of FIG. 6A corrected as the second correction grid $G_{(M-m1+1) \times n1}''$.

Refer to FIGS. 6A and 6B. FIG. 6A is a position diagram of the to-be-processed grid $G_{n1 \times m1}$ of FIG. 4B corrected as the first correction grid $G_{(M-m1+1) \times n1}'$. FIG. 6B is a position diagram of the first correction grid $G_{(M-m1+1) \times n1}'$ of FIG. 6A corrected as the second correction grid $G_{(M-m1+1) \times n1}''$.

The first correction unit 110 could sequentially correct the to-be-processed block $T_{r1 \times q1}$ using the correction method of the first embodiment and sequentially correct all to-be-processed grids $G_{n1 \times m1}$ of the (r1×q1)-th to-be-processed block $T_{r1 \times q1}$ according to the same correction direction of the first embodiment. The difference lies in that several first correction grids $G_{(M-m1+1) \times n1}'$ of FIG. 6A are obtained by rotating the to-be-processed grids $G_{n1 \times m1}$ of FIG. 4B by 90° anti-clockwise.

Detailed descriptions are disclosed below.

Refer to FIG. 6A. In the example of the (r1×q1)-th to-be-processed block $T_{r1 \times q1}$, the first correction unit 110 corrects the (n1×m1)-th to-be-processed grid $G_{n1 \times m1}$ according to the (r1×q1)-th mesh table $PT1_{r1 \times q1}$ of the first mapping relationship P1, and writes the corrected (n1×m1)-th to-be-processed grid $G_{n1 \times m1}$ to the ((M−m1+1)×n1)-th first correction grid $G_{(M-m1+1) \times n1}'$ of the first correction image IM21. In the example of the to-be-processed grid $G_{1 \times 1}$ (illustrated in FIG. 6A) of FIG. 4B, the corrected to-be-processed grid $G_{1 \times 1}$ is written to the first correction grid $G_{M \times 1}'$ of FIG. 6A. In the example of the to-be-processed grid $G_{1 \times m1}$, the corrected to-be-processed grid $G_{1 \times m1}$ is written to the first correction grid $G_{(M-m1+1) \times 1}'$ of the first correction image IM21 of FIG. 6A. By the same analogy, all to-be-processed grids $G_{n1 \times m1}$ of FIG. 6A could be corrected and rotated. With respect to the to-be-processed image IM1, the first correction image IM21' is rotated 90° anti-clockwise (the first rotation direction).

In step S30, the rotated first correction image IM21' is corrected as a second correction image IM22 by the second correction unit 120 according to the (r1×q1)-th mesh table $PT2_{r1 \times q1}$ of the second mapping relationship P2 along the same correction direction. For example, the first correction block $T_{(Q-q1+1) \times r1}''$ is sequentially corrected as the second correction block $T_{(Q-q1+1) \times r1}''$ by the second correction unit 120 according to a parameter (Q−q1+1) in an ascending order and a parameter r1 in an ascending order. Similarly, when correcting the ((Q−q1+1)×r1)-th first correction block $T_{(Q-q1+1) \times r1}'$, the second correction unit 120 sequentially corrects the first correction grid $G_{(M-m1+1) \times n1}'$ as a second correction grid $G_{(M-m1+1) \times n1}''$ according to a parameter (M−m1+1) in an ascending order and a parameter r in an ascending order.

Additionally, the image processing device 100 could output the second correction image IM22 to display the second correction image IM22.

Third Embodiment

Figure 7:
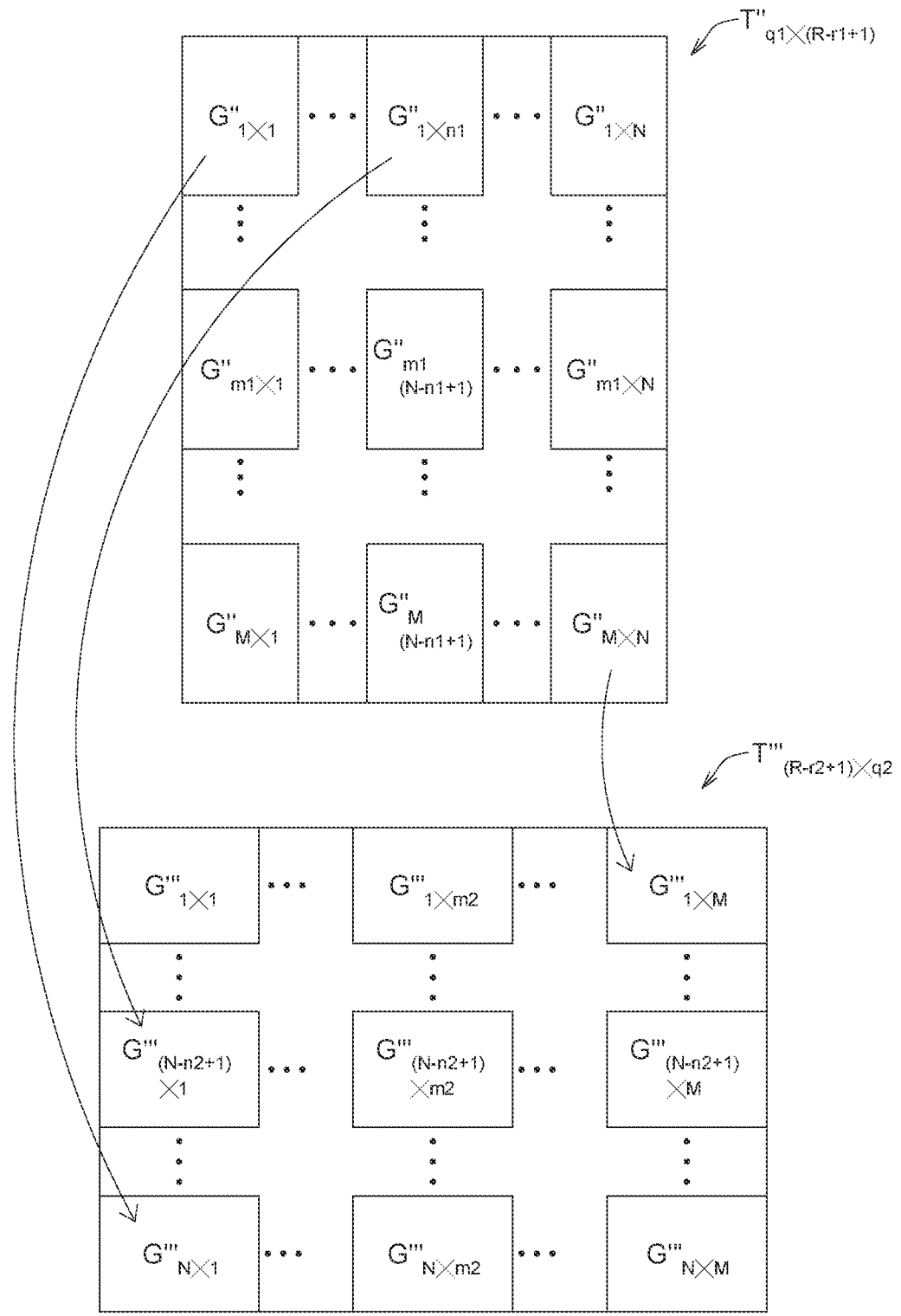
FIG. 7 is a diagram of writing the second correction grid $G_{m1 \times (N-n1+1)}''$ of FIG. 4D to the third correction grid $G_{(N-n2+1) \times m2}'''$ of the third correction block $T_{(R-r2+1) \times q2}'''$.

Referring to FIG. 7, a diagram of writing the second correction grid $G_{m1 \times (N-n1+1)}''$ of FIG. 4D to the third correction grid $G_{(N-n2+1) \times m2}'''$ of the third correction block $T_{(R-r2+1) \times q2}'''$ is shown. In the present embodiment, with respect to the second correction image IM22, the third correction image IM3 is rotated 90° anti-clockwise (the second rotation direction), and the direction of the third correction image IM3 remains the same with respect to the to-be-processed image IM1, that is, the third correction image IM3 is not rotated.

For example, the second correction unit 120 sequentially writes the second correction block $T_{q1 \times (R-r1+1)}''$ of FIG. 7 to the third correction block $T_{(R-r2+1) \times q2}'''$ of the third correction image IM3 according to a parameter q1 in an ascending order (the value is represented by q2) and a parameter (R−r1+1) in an ascending order (the value is represented by r2). Thus, with respect to the to-be-processed image IM1, the third correction image IM3 is not rotated. Besides, in the example of the second correction block $T_{q1 \times (R-r1+1)}''$ of FIG. 4D, the second correction unit 120 sequentially writes the second correction grid $G_{m1 \times (N-n1+1)}''$ to the third correction grid $G_{(N-n2+1) \times m2}'''$ of the third correction block $T_{(R-r2+1) \times q2}'''$ according to a parameter m1 an ascending order starting (the value is represented by m2) and a parameter (N−n1+1) in an ascending order (the value is represented by n2).

Moreover, the image processing device 100 could output the third correction image IM3 to display the third correction image IM3.

Fourth Embodiment

Figure 8:
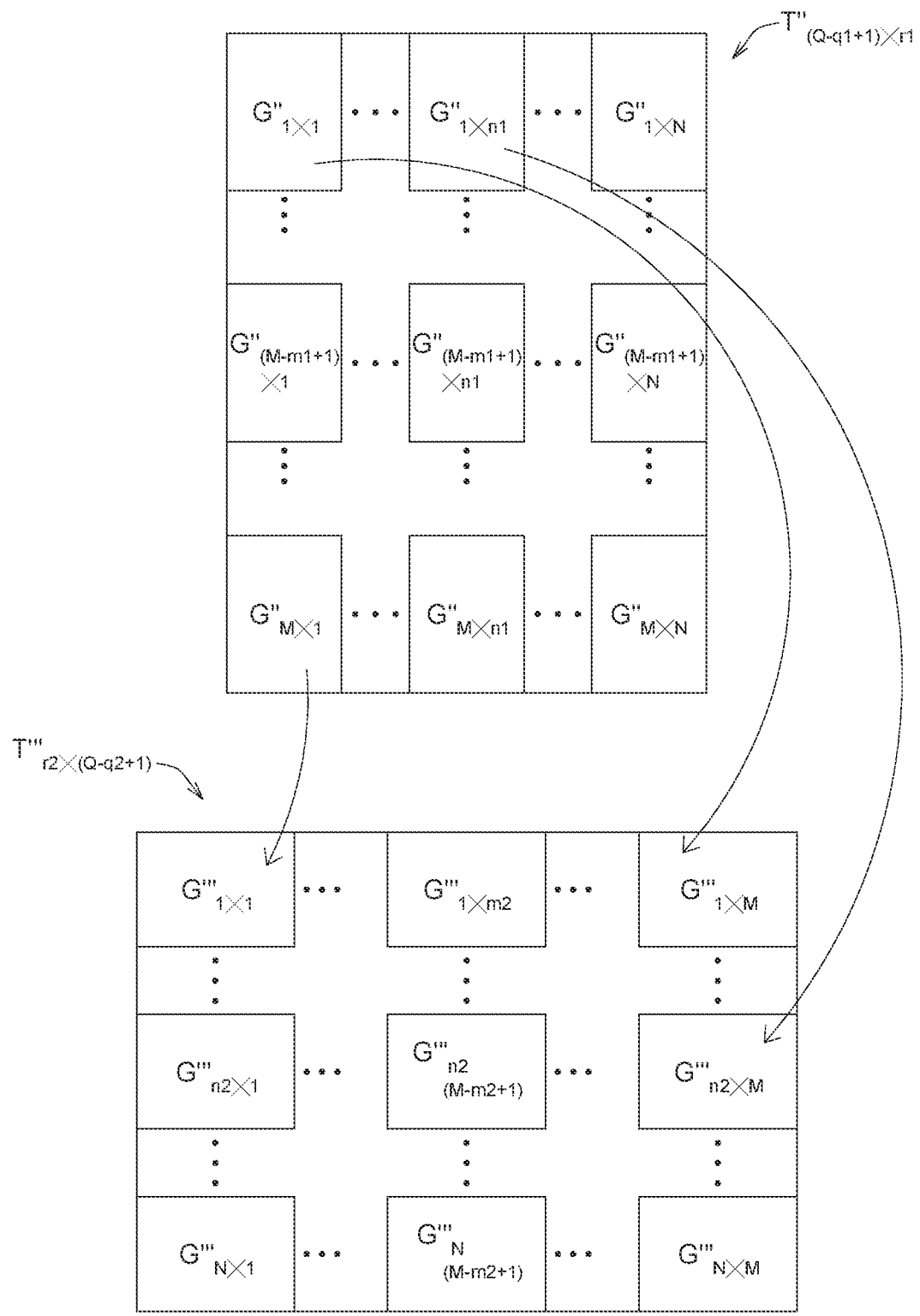
FIG. 8 is a diagram of writing the second correction grid $G_{(M-m1+1) \times n1}''$ of FIG. 6B to the third correction grid $G_{n2 \times (M-m2+1)}'''$ of the third correction block $T_{r2 \times (Q-q2+1)}'''$.

Referring to FIG. 8, a diagram of writing the second correction grid $G_{(M-m1+1) \times n1}''$ of FIG. 6B to the third correction grid $G_{n2 \times (M-m2+1)}'''$ of the third correction block $T_{r2 \times (Q-q2+1)}'''$ is shown. In the present embodiment, with respect to the second correction image IM22, the third correction image IM3 is rotated 90° clockwise (the second rotation direction), such that the direction of the third correction image IM3 remain the same with respect to the direction of the to-be-processed image IM1, that is, the third correction image IM3 is not rotated with respect to the to-be-processed image IM1.

For example, the second correction unit 120 sequentially writes the second correction block $T_{(Q-q1+1) \times r1}''$ to the third correction block $T_{r2 \times (Q-q2+1)}'''$ of the third correction image IM3 according to a parameter (Q−q1+1) in an ascending order (the value is represented by q2) and a parameter r in an ascending order (the value is represented by r2). Thus, with respect to the to-be-processed image IM1, the third correction image IM3 is not rotated. Furthermore, in the example of the second correction block $T_{(Q-q1+1) \times r1}''$ of FIG.

6B, the second correction unit 120 sequentially writes the second correction grid $G_{(M-m1+1) \times n1}''$ to the third correction grid $G_{n2 \times (M-m2+1)}'''$ of the third correction block $T_{r2 \times (Q-q2+1)}'''$ according to a parameter (M−m1+1) in an ascending order (the value is represented by m2) and a parameter n1 in an ascending order (the value is represented by n2).

To summarize, the it mage processing device corrects the to-be-processed image as a first correction image according to the first mapping relationship along the correction direction, then rotates the first correction image by an angle along a first rotation direction, and corrects the rotated first correction image as a second correction image according to the second mapping relationship along the same correction direction. The said first rotation direction could be clockwise or anti-clockwise, and the said angle could be 90°. The said "correction direction" refers to the to-be-processed image and/or the correction order of several blocks of the first correction image. Since the deformation of the to-be-processed in age along two different directions could be corrected along the same "correction direction", correction complexity could be simplified. Besides, the to-be-processed in age could be divided into a fixed number of to-be-processed blocks. Even when the to-be-processed image has high distortion complexity, the number of to-be-processed blocks processed by the image processing device still remains unchanged, such that correction complexity could be simplified. In another embodiment, the image processing device could rotate the second correction image by an angle along the second rotation direction to obtain a third correction image, wherein the direction of the third correction image remains the same with respect to the to-be-processed image, that is, the third correction image is not rotated.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, comprising:
   (a) correcting a to-be-processed image as a first correction image according to a first mapping relationship along a correction direction;
   (b) rotating the first correction image by an angle; and
   (c) correcting the rotated first correction image as a second correction image according to a second mapping relationship along the same correction direction;
   wherein the image processing method further comprises:
      dividing the to-be-processed image into a plurality of to-be-processed blocks $T_{r1 \times q1}$, wherein the (r1×q1)-th to-be-processed block $T_{r1 \times q1}$ is sequentially corrected according to a parameter r1 in an ascending order and a parameter q1 in an ascending order.

2. The image processing method according to claim 1, wherein the angle is +/−90°.

3. The image processing method according to claim 1, wherein the image processing method further comprises:
   storing the to-be-processed blocks sequentially to a memory.

4. The image processing method according to claim 1, wherein step (a) comprises:
   correcting each to-be-processed block as a first correction block according to the first mapping relationship;
step (b) comprises:
   sequentially rotating the corrected first correction blocks by 90° along a first rotation direction;
step (c) comprises:
   sequentially correcting the first correction blocks into a plurality of second correction blocks according to the second mapping relationship.

5. The image processing method according to claim 1, wherein the image processing method further comprises:
   (d) correcting the second correction image as a third correction image along the same correction direction, wherein the direction of the third correction image remains the same with respect to the to-be-processed image.

6. The image processing method according to claim 4, wherein step (d) comprises:
   sequentially rotating the second correction blocks by 90° along a second rotation direction inverse to the first rotation direction.

7. An image processing device, wherein the image processing device further comprises:
   a first correction unit configured to: correct a to-be-processed image as a first correction image and rotate the first correction image by an angle according to a first mapping relationship along a correction direction; and
   a second correction unit configured to: correct the rotated first correction image as a second correction image according to a second mapping relationship along the same correction direction;
   wherein the first correction unit is further configured to:
      divide the to-be-processed image into a plurality of to-be-processed blocks $T_{r1 \times q1}$, wherein the (r1×q1)-th to-be-processed block $T_{r1 \times q1}$ is sequentially corrected according to a parameter r1 in an ascending order and a parameter q1 in an ascending order.

8. The image processing device according to claim 7, wherein the angle is +/−90°.

9. The image processing device according to claim 7, wherein the image processing device further comprises a memory; and the first correction unit is further configured to:
   store the to-be-processed blocks sequentially to the memory.

10. The image processing device according to claim 7, wherein the first correction unit is configured to:
   correct each to-be-processed block as a first correction block according to the first mapping relationship;
   sequentially rotate the corrected first correction blocks by 90° along a first rotation direction;
the second correction unit is configured to:
   sequentially correct the first correction blocks as a plurality of second correction blocks according to the second mapping relationship.

11. The image processing device according to claim 7, wherein the second correction unit is further configured to:
   correct the second correction image as a third correction image along the same correction direction, wherein the direction of the third correction image remains the same with respect to the to-be-processed image.

12. The image processing device according to claim 10, wherein the second correction unit is further configured to:
   sequentially rotate the second correction blocks by 90° along a second rotation direction inverse to the first rotation direction.

* * * * *